United States Patent [19]

Shobert

[11] Patent Number: 4,976,550
[45] Date of Patent: Dec. 11, 1990

[54] EXPANDED FIBER-REINFORCED BEARINGS

[75] Inventor: James P. Shobert, Walkerton, Ind.

[73] Assignee: Plas/Steel Products, Inc., Walkerton, Ind.

[21] Appl. No.: 80,913

[22] Filed: Aug. 3, 1987

[51] Int. Cl.$^5$ .................... F16C 33/18; F16C 33/20
[52] U.S. Cl. .................... 384/298; 384/300; 384/907.1; 384/911
[58] Field of Search ............... 384/298, 300, 299, 911, 384/907.1, 909

[56] References Cited

U.S. PATENT DOCUMENTS 3,574,429 4/1971 Reising .
3,832,255 8/1974 Shobert .

Primary Examiner—Lenard A. Footland
Attorney, Agent, or Firm—Pearne, Gordon, McCoy & Granger

[57] ABSTRACT

A plastic bearing is provided, as well as a method of fabricating these bearings, in which a number of strands of expanded polytetrafluoroethylene fibers are woven about a cylindrical mandrel to form a fabric about this mold surface. The fabric is then impregnated with a hardenable plastic. The plastic is hardened and the bearing is removed from the mold surface. The resulting plastic bearing has greatly improved wear resistance which permits new applications.

2 Claims, 1 Drawing Sheet

EXPANDED FIBER-REINFORCED BEARINGS

BACKGROUND OF THE INVENTION

The present invention relates to improvements in a method of fabricating plastic bearings, and more particularly to bearings which utilize expanded polytetrafluoroethylene fibers in impregnating resins.

Prior Art

U.S. Pat. No. 3,832,255 teaches a method of fabricating plastic bearings utilizing strands of polytetrafluoroethylene fibers intertwined to form a cord which has an irregular outer surface. The cord is formed into a woven fabric which becomes a tubular bearing layer for the hollow, cylindrical bearing. The fabric is impregnated with a liquid plastic to flow into the irregularities and interstices in the fabric. This secures the cords and fibers relative to each other.

U.S. Pat. No. 3,574,429 teaches a bearing made of an open-celled resin foam of polytetrafluoroethylene impregnated with a harder resin.

SUMMARY OF THE INVENTION

The present invention relates to a hollow, cylindrical bearing which may be used in a corrosive or hostile environment, such as in earth moving equipment. The bearing has a low-friction bearing surface provided by expanded polytetrafluoroethylene fibers which are embedded in a resinous material. The expanded polytetrafluoroethylene fibers are more porous than the known polytetrafluoroethylene fibers. The porous fibers tend to lock better in relation to one another and to the impregnating resin. The bearing made by the present method has an abrasion resistance from four to seven times that of polytetrafluoroethylene bearings made using the previously known methods. This improvement is so significant as to be unexpected.

It is an advantage of the present invention to provide a self-lubricating plastic bearing which has significantly improved abrasion resistance. This permits applications of plastic bearings which were not before possible.

DETAILED DESCRIPTION OF THE DRAWINGS

Figure 1:
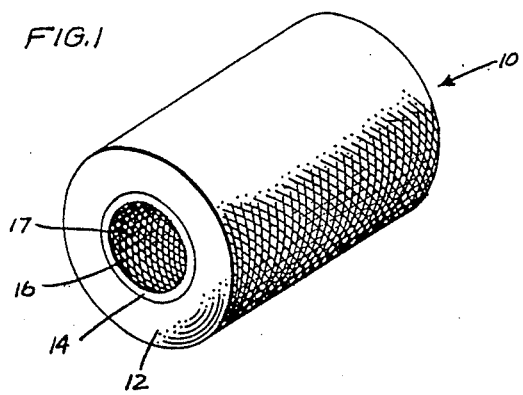
FIG. 1 is a perspective illustration of one bearing embodiment of this invention.

The present invention is applicable to structures wherein bearing surfaces are required to reduce friction between moving surfaces. The bearings disclosed herein are primarily cylindrical in shape; however, the principles of this invention may be employed in making other shapes. Generally speaking, the bearing of this invention is fabricated of essentially the same materials as are conventionally used in glass-reinforced plastic fishing rods, archery bows and arrows, and the like.

In one embodiment of this invention, the cylindrical bearing 10 is a single lamination constructed primarily of strands of expanded polytetrafluoroethylene. These strands 36 are composed of fibers such as that manufactured by W. L. Gore & Associates, Inc. under the trademark GORE-TEX. Such fiber has a breaking tenacity of more than 3 grams/denier, a modulus of elasticity of $1.3 \times 10^6$ psi/denier, excellent flex life and abrasion resistance, and a continuous use temperature range of $-350°$ F. to $+550°$ F. The strands used preferably have a fineness of 400 denier and 60 filaments, with zero twist in the individual strands.

A plurality of such strands are fed from spools 22 forming part of a braiding machine onto a mandrel 32 to form a woven tube. The strands are crisscrossed in woven relationship with each other, each strand following the form of a helix from one end of the bearing to the other.

As a result of the manufacturing process, the tube has outer and inner surfaces which are irregular in the sense that they have a multiplicity of longitudinally repeated raised and depressed portions. The weave also has pores provided by interstices between strands and within the strands themselves.

In a second embodiment, a reinforcing layer 12 of helically braided glass threads coaxially overlies the bearing layer 14, these threads being braided together in the same pattern as described. Both of these layers 12 and 14 are embedded in epoxy or polyester resin; however, the inner peripheral surface 17 of the lamination 14 has exposed substantial portions of the pure expanded polytetrafluoroethylene fibers which constitute the cords of the layer 14.

The two layers 12 and 14 are intimately and rigidly held together by means of the polyester or epoxy resin. The glass threads preferably are of the glass yarn type, commonly referred to as "roving," each thread being composed of a multiplicity of tiny elongated fibers which, in effect, when bundled together, form the final continuous length of thread.

Figure 4:
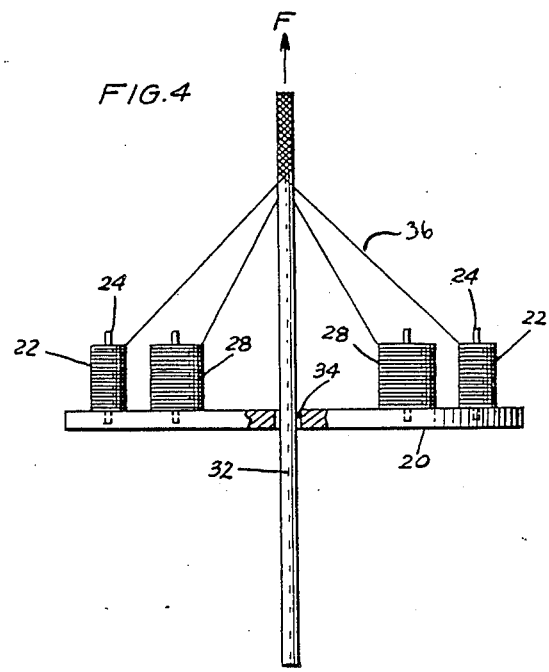
FIG. 4 is a diagrammatic illustration, partly in vertical section, of an apparatus used in the fabrication of this bearing.
Figure 5:
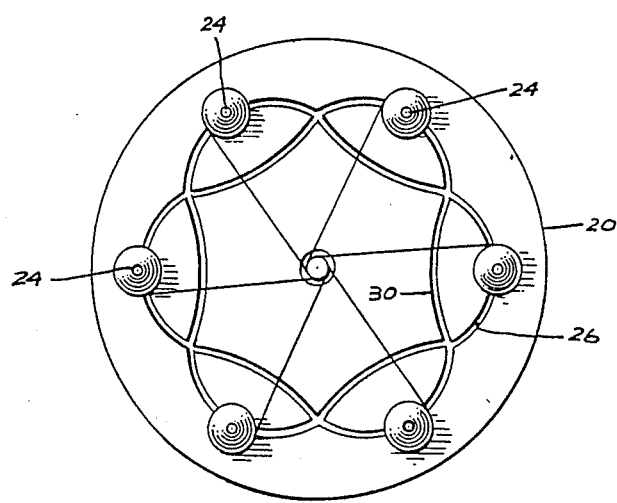
FIG. 5 is a top plan view in diagrammatic form of the apparatus of FIG. 4.

A method of fabricating the bearing will now be exlained. Referring to FIGS. 4 and 5, a conventional braiding machine carries on its supporting table 20 a suitable number (six in the present instance) of spools 22 and 28 of expanded polytetrafluoroethylene strands or glass thread, depending upon the particular stage of processing. At this stage, the spools have the expanded polytetrafluoroethylene strand 36 thereon. These particular spools 22 and 28 are supported on suitable spindles 24, which fit into guide grooves 26 which follow an undulating pattern as illustrated in FIG. 5. There are two series of spools on table 20, the spools 22 being characterized herein as the outer spools, while spools 28 are considered as the inner spools. Reference to FIG. 5 clearly shows that there are two different undulating grooves 26 and 30 which cross over alternately as illustrated, and the spools 22 and 28 respectively ride in these grooves.

A mandrel 32, cylindrically shaped, is passed through a clearance opening 34 in table 20, as shown. An operator can hold this mandrel 32 in position and operate it in the proper manner, as will be explained.

Strands 36 of expanded polytetrafluoroethylene from the respective spools 22 and 28 are individually affixed to the upper end of mandrel 32 by some suitable means, such as by tying with a string or the like. This places the apparatus in readiness for operation.

In operation, mandrel 32 is slowly raised in the direction of the arrow "F," while spools 22 and 28 are moved at a uniform rate of speed through the guiding grooves 26 and 30, respectively. Considering for a moment the motion of one spool 22, it will form an interweaving braid with the strands from the spool 28. The mandrel 32 is continuously raised at a uniform rate until the braiding operation is completed for the entire length thereof. The individual strands 36 are then cut and secured against loosening by adhesive tape or string tied tightly around the mandrel, thereby leaving the mandrel 32 with a braided layer of expanded polytetrafluoroethylene fibers. In one embodiment, the strands extending in one helical direction are parallel and contiguous, as are the cords extending in the opposite helical direction. This provides a woven fabric having a minimum of visible openings. Pores will exist, however, due to interstices within and between fibers, strands, and in the woven pattern itself. The density with which this weaving is performed may be controlled to suit design requirements, such as, for example, by controlling the speed at which the mandrel 32 is raised and the tension on the strands 36 as they pay off the spools 22 and 28.

As the next operation, the mandrel 32 with the first layer 14 of braid just described is passed through another braiding apparatus identical to the one disclosed in FIGS. 4 and 5, but which differs only in the respect that the spools 22 and 28 contain glass threads.

By this means, a helical braid of glass thread is applied to the tubular bearing layer of expanded polytetrafluoroethylene cords 15. It is preferable that a second, and in some instances a third or more, layer of glass thread be applied to the mandrel to build up a substantial layer of glass thread in comparison with the expanded polytetrafluoroethylene layer. The radial thickness of the layer 12 is therefore greater than that of layer 14. The mandrel with its composite covering is next submerged into a catalyzed bath of liquid polyester or epoxy resin material until the threads and cords are soaked or impregnated and embedded. Thereafter, the mandrel with its impregnated covering is placed in a heated curing mold or oven until the resin is completely cured and hardened.

As the last step, the mandrel 32 is removed from the resin-supported layers or laminations 12, 14, the resultant product being a hollow, self-supporting tube composed of tubular laminations of resin, glass, and expanded polytetrafluoroethylene materials.

Figure 2:
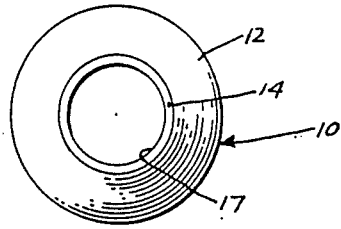
FIG. 2 is an end view thereof.
Figure 3:
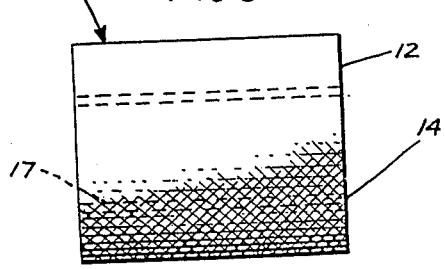
FIG. 3 is a side view.

Different techniques for impregnating or embedding the composite covering on the mandrel 32 may be employed, such as vacuum impregnation, dipping, and brushing. It is important that the impregnation be thorough and that no voids or air pockets exist within the structure. It is also important that the resin intimately and substantially engage the expanded polytetrafluoroethylene fibers, as well as the pores within the fibers, for the purpose of securing the same in position. It is important to note that the expanded polytetrafluoroethylene strands applied to the mandrel 32 are under tension as they are intimately wound or wrapped onto the mandrel so that when the mandrel and its layers are impregnated with or embedded in the resin, the resin will not penetrate to the mandrel in the areas contacted by the expanded polytetrafluoroethylene fibers, but will leave the fibers which are in contact with the mandrel free and clear of any resin. Thus, the finished surface will be relatively smooth and include the fibers and the strands, as well as the resin, in the spaces within and between the fibers and strands. The resin intimately engages a sufficient portion of the expanded polytetrafluoroethylene strands and fibers so as to secure these firmly in place, the resin in effect constituting a matrix which holds the strands and fibers in position. The hardened composite tube removed from the mandrel 32, if too long, can be cut into shorter lengths so as to obtain the size bearings depicted in FIGS. 1 through 3.

By reason of the irregular surfaces of the woven fabric, as well as the pores within the strands of expanded polytetrafluoroethylene, the liquid resin penetrates the various interstices of the fabric and anchors the individual fibers against displacement. The resin becomes a holding matrix which ultimately secures and anchors the fibers in position in the bearing surface 16. This permits a maximum amount of lubricous fiber being disposed and distributed throughout the bearing surface 16, to enhance the lubricous qualities of the bearing.

The invention was tested against a prior art bearing made in a similar manner using polytetrafluoroethylene fibers which are not expanded. The invention demonstrated a wear life which is so far superior to the prior art bearing as to be unanticipated and unobvious.

A bearing made in accordance with the invention and a prior art bearing as described above were each subjected to failure testing at a pressure velocity (PV) of 15,000 (psi-fpm). The bearings were rotated about a central axis at a velocity of 200 rpm. A transverse load of 382 psi was applied to the bearing surfaces. The test was continued to wear failure. The prior art bearing demonstrated a wear life of 600–700 hours, while the bearing in accordance with the invention had a wear life of more than 5,000 hours. This test demonstrates that the invention has a wear life that is more than seven times that of the prior art.

While the principles of this invention have been described in connection with specific apparatus, it is to be clearly understood that this description is made only by way of example and not as a limitation to the scope of the invention.

What is claimed is:

1. A polymeric bearing comprising a plurality of strands of expanded polytetrafluoroethylene fibers having a breaking tenacity of more than 3 grams per denier and a continuous use temperature of about −350° F. to about +550° F., said strands having a fineness of about 400 denier, said strands being helically wound about a cylindrical surface to form a bearing tube having an inner bearing surface with a plurality of raised and depressed surfaces, the bearing tube including pores provided by interstices between and within said strands, and a resin selected from the group consisting of epoxy and polyester resins, said resin impregnating said depressed surfaces and said pores.

2. A bearing as set forth in claim 1, wherein said polymeric bearing comprises an inner lamination, and further comprising an outer lamination formed from glass threads helically wound to form a concentric reinforcing tube, said glass threads being secured in position and said reinforcing tube being laminated to said bearing tube by means of said resin.

* * * * *